June 28, 1938.  J. SNEED  2,122,218
CLUTCH
Filed April 29, 1935  4 Sheets-Sheet 2

Inventor
JOHN SNEED

By
Ridley & Watts
Attorney

Patented June 28, 1938

2,122,218

UNITED STATES PATENT OFFICE 2,122,218

CLUTCH

John Sneed, Grosse Pointe Shores, Mich.

Application April 29, 1935, Serial No. 18,811

14 Claims. (Cl. 192—103)

This invention relates to friction devices and more particularly to friction clutches wherein engagement or disengagement of the clutch is effected automatically in response to changes in the forces transmitted and the speed of rotation thereof.

In the present application I will describe my invention as applied to an automotive vehicle inasmuch as my clutch is particularly adapted to the requirements of such service. However, it will be understood that my invention may be applied to other uses in other environments.

It is among the objects of my invention to provide an automatic clutch or friction device which will engage and disengage at varying rates depending upon variations in speed and load on the clutch. A further object of my invention is to provide an automatic clutch which will smoothly engage under various conditions of speed and load. Another object of my invention is to provide a clutch which will automatically tend to slip when overloaded. Another object of my invention is to provide a clutch in which at least a part of the driving force is taken through resilient members which also function to maintain the clutch engagement so that overloads which effect the members will permit the clutch to slip. Another object of my invention is to provide an automatic clutch having a simple and effective means for manual engagement and disengagement.

Another object of my invention is to provide an automatic friction clutch in which within determinable limits the pressure between the frictional elements of the clutch increases as the speed increases and tends to be decreased by torque overloads whereby smooth clutch engagement and smooth operation is obtained under all conditions of speed and load. Another object of my invention is to provide a clutch mechanism which is simple in construction, light in weight, compact in size, economical in manufacture, and durable and dependable in operation.

It is a further object of my invention to provide an automotive clutch mechanism which will automatically permit slippage between the driving and driven clutch parts in response to shocks or overloads in the driving mechanism of the automobile with which the clutch is operatively connected. Within this object I provide a clutch which protects itself and its related mechanism by slipping or releasing in response to relatively light shocks or overloads under conditions of low speed and torque, but which will transmit high torque loads under conditions of relatively high speed and torque and still be sensitive to provide slippage or release from shocks or overloads under these latter conditions.

Another object of my invention is to provide a clutch in which the tendency to resist slippage may be adjusted or calibrated so as to vary with the speed between determinable and adjustable limits, and also in which the tendency of the clutch to slip in response to shocks or overloads may within reasonable limits be adjusted to vary in substantial proportion to the torque transmitted.

In my invention as adapted to an automotive clutch, I preferably attain the objects enumerated above by providing a clutch which may be associated with the fly wheel of the engine of a motor car and which preferably comprises a pressure plate driven by the fly wheel and a friction disc or driven member mounted on a shaft leading to the transmission of the car. The pressure plate is preferably moved into engagement by means of centrifugally actuated weights mounted on a casing which is carried by the fly wheel, the weights preferably being arranged to act through springs to rotate the pressure plate with respect to the casing and fly wheel in a direction opposite to the tendency of the clutch to slip. By means of balls acting on oppositely disposed inclined planes in the casing and on the pressure plate, the relative rotation between the pressure plate and the casing causes the pressure plate to be moved axially into engagement with the friction disc. The inclined planes and balls are arranged however so that the load on the driven clutch part tends to release the engagement between the driving pressure plate and the driven friction disc, and by this arrangement the engagement of the clutch is governed both by the speed of the motor and by the load on the clutch, an increase in speed tending to cause an increase in the pressure between the pressure plate and friction disc and an increase in load tending to cause a reduction in such pressure. By reason of this construction the rate of clutch engagement or disengagement and the engaging pressures are controlled both in accordance with speed and load, resulting in a smooth engagement of the clutch under all conditions and resulting in slippage of the clutch during a condition of overload.

In a modification of my invention, I provide manual means for releasing the clutch and means for engaging the driven part of the clutch when the engine is stopped so that the engine can be started, in the event of starter failure, by pushing the car or otherwise rotating the driving wheels. This last mentioned means may preferably comprise a ratchet disc mounted for rotation with the driven element of the clutch and a pawl pivotally mounted on the engine fly wheel. The pawl may be urged into engagement with the ratchet by a spring and the arrangement is such that the pawl and ratchet mechanism will function to transmit torque only from the driven member to the driving elements. The pawl may be pivotally mounted on one of the driving elements and is weighted so that when the engine starts to run, the pawl will by centrifugal effect swing out of engagement with the ratchet against the force of the spring and under all normal operating conditions will take no part in the function and operation of the clutch.

In the drawings:

Figs. 8 and 9 are sectional and end elevations respectively of the clutch of my invention provided with a manual release;

Figures 9a and 9b are elevations with parts broken away showing alternative governor weight constructions;

Referring to the drawings, my clutch mechanism as adapted to an automobile of conventional construction may be mounted adjacent the fly wheel 1 of the motor vehicle engine (not shown) and may be enclosed within a main clutch casing 2 provided with forwardly extending annular walls. The outer annular wall is radially flanged at the periphery as at 3 and may be attached by screws or other suitable means to the rear radial wall of the fly wheel.

The frictional drive in my clutch is preferably obtained by means of an annular ring or pressure plate 4 arranged within the compartment formed by the casing 2 and the fly wheel and is supported therein by the inner annular wall of the clutch casing 2 for limited movement axially. Forward axial movement brings the pressure plate 4 into engagement with a single friction disc member 11 which may be provided on each face with friction material 14 and 15, although it is to be understood that my invention may be adapted to multiple disc clutches and other types of friction devices. The disc 11 is supported at its center by rivets 18 on a hub 12 which is splined to the driven shaft 10 which extends rearwardly to the transmission (not shown). It will be seen that forward movement of the pressure plate 4 will cause frictional engagement between the plate 4 and the disc 11 and will likewise slide the disc forwardly to cause its forward face to engage with the radial portion of the fly wheel 2 and thus effect engagement of the clutch.

In order to advance the pressure plate 4 into engagement with the clutch disc 11, I have provided speed responsive means mounted within the casing 2. This speed responsive mechanism may comprise a plurality of governor weights 30 mounted upon pivot pins 31 which are securely fixed to the rear radial wall of the clutch casing 2. The governor weights are preferably crescent shape as illustrated in the drawings and are apertured at one end to receive a pivot sleeve 38 mounted on the pin 31. The pivot sleeve 38 also supports a U-shaped spring bracket 32 in which the side portions of the U are arranged to extend on either side of the apertured end of the governor weight, the side portions of the U being likewise pivoted on the sleeve 38.

To support driving or reaction springs 33, the bight portion of the U-shaped spring bracket 32 is extended beyond the side portions thereof as at 34 and is provided with a spring supporting pin 36. The other end of the spring 33 is supported on the governor weight 30 by means of a spring supporting pin 35 mounted on the projection 39 of the governor weight. The expansion of the spring 33 is limited by a projection 40 on the governor weight which serves as an abutment for the bight portion of the spring bracket 32. The bracket 32, governor weight 30 and spring 33 may be assembled by placing the spring upon the spring supports 35 and 36 of the governor weight and bracket, respectively, aligning the apertures in the governor weight and bracket and then inserting the sleeve 38 in the aligned apertures. The assembly may then be placed in the clutch mechanism by merely slipping the sleeve over the pin 31 and may be secured thereto by means of a washer or disc held to the pin by screws or other suitable means as shown, for example, in Figure 5. It will be seen that the assembly is free to pivot about the pin 31 as a unit, and the governor 30 and the bracket 32 may also pivot with respect to each other upon the sleeve 38. By providing a self-contained sub-assembly of each of the governor weights with one of the springs 33 and one of the spring brackets 32 and one of the sleeves 38, each spring may be given an initial compression in making this assembly so that there will be no give in the spring until the load transmitted across it exceeds the initial compression with which it is loaded. In this manner I am assured that where it is desired, the initial motion of the governor weights will be transmitted directly to the pressure plate and in direct proportion to the movement of the governor weights until such time as the various forces reacting through the springs 33 exceed their initial compressed load. By the selection of springs 33 of various characteristics and by selecting the desired amount of initial compression to impose upon these springs, I can readily select and predetermine the characteristics of operation of my clutch within a wide range of choice. With the results which will hereinafter more fully appear, I contemplate that the range of selection of springs 33 may vary from a light spring having substantially no initial compression on one hand, to a very heavy spring with a high initial compression or even a solid member in lieu of the spring 33 on the other hand.

To control the outward movement of the governor weights in response to the action of centrifugal force, the free end of each governor weight is attached to a governor retractor spring 42 which is preferably anchored to the inner annular wall of the governor weight casing as at 42a. The effect of the spring 42 is to urge the governor weight inwardly and through the projection 40 thereon, the spring bracket 32 about the pivot pin 31 to the innermost radial governor position. The inward governor movement is limited by the pads 43 of the governor weight contacting the inner annular wall of the governor weight casing, while the outward movement may be limited by the adjusting screws 46 carried in the outer annular wall of the casing 2.

In order to translate the swinging movement of the governor weights into relative rotational movement between the casing and the pressure plate 4, the pressure plate preferably has fixed thereto adjacent each governor weight and bracket assembly a rearwardly projecting pin 44 preferably surrounded by a square sleeve 45. A flat face of the sleeve 45 contacts the bight portion of the spring bracket 32 opposite spring 33 and has a smooth sliding contact therewith. Pivotal movement of the spring bracket 32 will thus effect a rotational movement of the pressure plate 4 with respect to the casing 2. The pivotal movement of the brackets 32 in one direction about the pivots 31 is effected through the springs 33 by the outward movement of the governor weights. Pivotal movement in the opposite direction is brought about by inward movement of the governor weights or by load reactions on the pressure plate through the engagement of the pins 44 and the spring brackets 32.

Between the clutch casing 2 and pressure plate 4 means are provided to cause forward movement of the pressure plate with respect to the casing to effect a clutch engagement. In the embodiment of my invention shown in Figure 1 a series of symmetrically spaced cam and ball units are preferably employed to accomplish this function. The pressure plate 4 is provided with a cam 52, the casing 2 with an oppositely disposed cam 51 and a steel ball 50 is arranged between the two cam faces.

Figure 5:
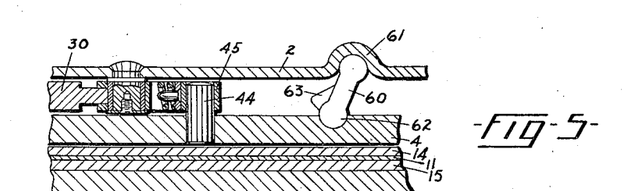
Fig. 5 is a detailed sectional view of an alternative form of the pressure plate actuating means.

Rotational movement of the pressure plate 4 within the governor casing 2 may be translated into axial movement of the pressure plate by means other than the cam and ball arrangement illustrated in connection with the above described embodiment of my invention. Alternative forms of pressure plate actuators are illustrated in Figures 5, 6 and 7.

One modified form comprises a link 60 with rounded end portions positioned in bearings 61 and 62 formed in the casing 2 and the pressure plate 4 respectively. The link 60 is preferably provided on one side with a stop lug 63 to prevent effective movement of the link past a dead center position.

Figure 6:
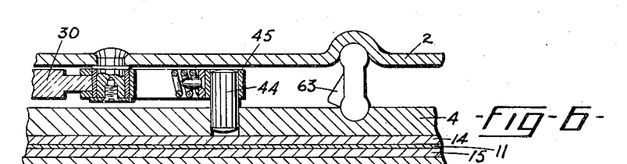
Fig. 6 is a sectional showing of the means illustrated in Fig. 5 moved to an operative position.

As illustrated in Fig. 6, the lug 63 contacts the pressure plate when the link 60 has been moved by the plate 4 to a position of maximum pressure. The transmission of driving torque tends to move the casing 2 in the opposite direction with respect to the pressure plate 4 and tends to return the link 60 to or toward a less inclined position as shown in Fig. 5.

Figure 7:
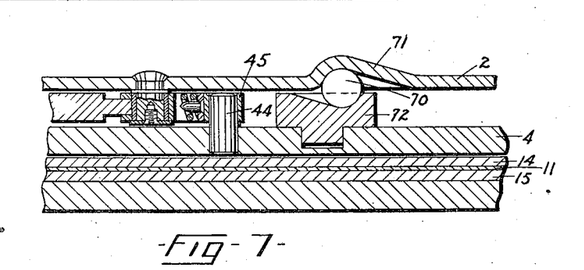
Fig. 7 is a sectional showing of another alternative form of the pressure plate actuating means.

A second modification of clutch actuating means is shown in Fig. 7 wherein the pressure plate 4 is formed with a cam surface 72 and the casing 2 is formed with a cooperating cam surface 71. A roller 70 is arranged between the cams 71 and 72 and the assembly functions substantially as the cam and ball assembly in the embodiment shown in Fig. 1 heretofore described in detail.

Figures 1, 2:
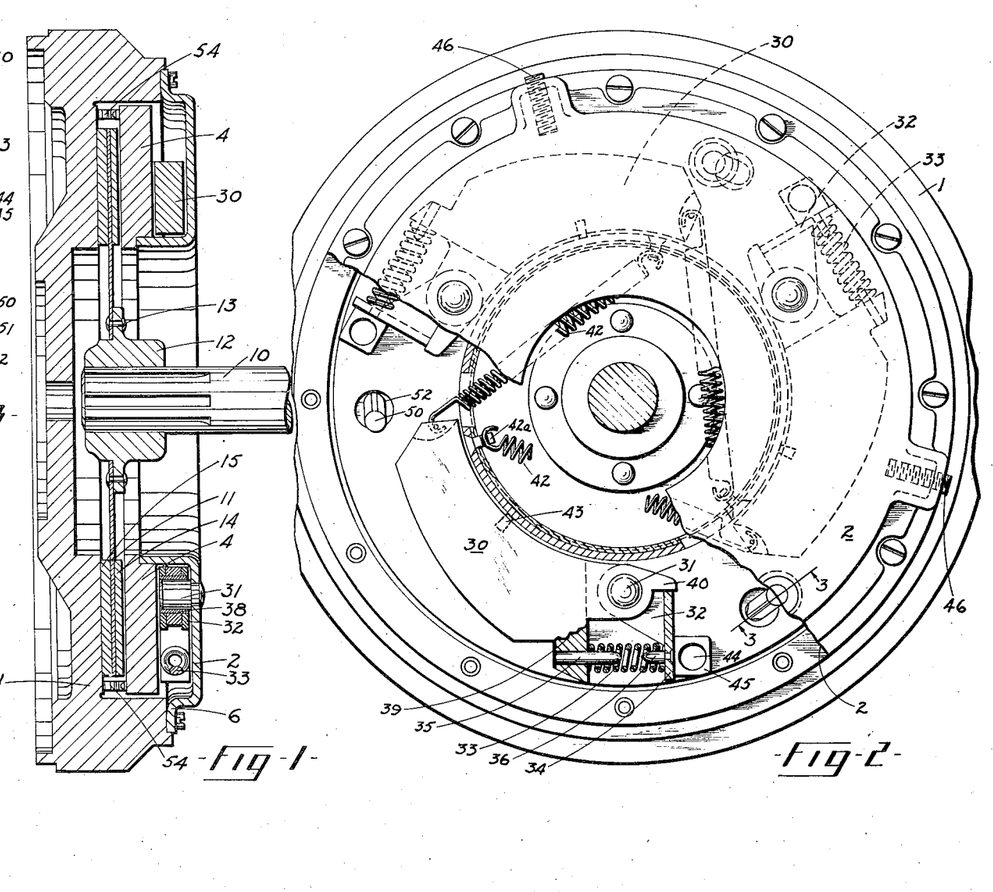
Fig. 1 is an axial sectional view of a form of clutch made according to my invention and adapted for use in an automobile.
Fig. 2 is an end elevation of the clutch mechanism with parts broken away to show the governor assembly.
Figure 3:
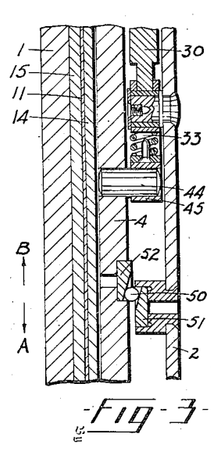
Fig. 3 is a sectional view along line 3—3 of Fig. 2.

As illustrated in Fig. 3 it will appear that rotational movement of the pressure plate 4 with respect to the governor weight casing 2 as indicated by the arrow A (counterclockwise as seen in Fig. 2) through the cam and ball engagement 50—51—52 tends to move the pressure plate and casing away from each other and tends to move the pressure plate forwardly whereby to frictionally engage the driven disc between it and the face of the flywheel.

The above mentioned relative rotational movement of the pressure plate 4 is produced by the rotation of the clutch casing and flywheel assembly. Centrifugal force causes the governor weights 30 to swing outwardly about the pivots 31 and through the compression springs 33, spring brackets 32, sleeves 45, and pins 44, moves the pressure plate 4 relatively counterclockwise (see Fig. 2) and to the left as shown in Fig. 3.

The pressure plate 4 is preferably provided with a series of flat leaf springs 54 spaced symmetrically about its perimeter. The springs are preferably secured to the forward face of the pressure plate by screws or other suitable means and the free ends of the springs slidably bear against the flywheel 1 to urge the pressure plate rearwardly out of contact with the friction disc. As the plate 4 is rotated with respect to the casing 2 the cam and ball reaction at 50, 51, and 52 presses the plate 4 forwardly to produce clutch engagement against relatively mild resistance by the springs 54.

It will be understood that the clutch during the above operation is responsive to torque as well as rotational speed. The transmitted torque, reacting through the disc 11 and friction member 14 tends to induce a relative clockwise rotation between the pressure plate 4 and the casing 2 opposite to that induced by outward movement of the governor weights. This relative clockwise movement between the pressure plate and casing, as indicated in Fig. 3 by the arrow B, with the attendant cam reaction at 50—51—52 has an axial component of movement of the pressure plate to the right as shown in Fig. 3 and tends to effect a decrease in the pressure on the plate 4 to permit slippage of the clutch disc 11, between the flywheel 1 and plate 4.

Referring thus to Figs. 1, 2 and 3, transmitted torque always tends to move the pressure plate 4 clockwise as shown in Fig. 2, and to the right as seen in Fig. 3, i. e., the torque tends to release the clutch. In opposition to this tendency, the centrifugal governor tends to move the pressure plate 4 counterclockwise as seen in Fig. 2 and to the left as seen in Fig. 3, i. e. the speed of the driving member tends to engage the clutch. These primary forces are directly opposed through the springs 33 and the ball and cam construction 50, 51, 52. Thus torque loads, for any given speed, which exceed either the force in the springs 33 or the circumferential component or result of the centrifugal effect of the governor weights, will cause the clutch to slip without substantially modifying the amount of torque actually transmitted whether the clutch has previously been engaged or not.

In the operation of my clutch as above described, the weights of the governor and the retractor springs 42 therefor may be so proportioned that for "idling speeds" of the driving member the weights will be held against outward movement and the clutch held in disengaged position, any accidental drag or rubbing of the pressure plate against the driven disc simply tending to preserve the disengagement of the clutch under these conditions. As the speed of the driving member is increased the governor weights begin to move radially outward and begin to impart a counterclockwise (as seen in Fig. 2) rotational movement to the pressure plate or plates with respect to the driving member in the direction of rotation of the driving member; the force and motion of the governor weights being transmitted through the springs 33, pins 44 and cam and ball assemblies 50—51—52, thus inducing an axial movement of the pressure plate toward the driven disc. Outward radial movement of the governor weights continues the above described movement of the pressure plate and attendant mechanism until frictional contact is reached between the pressure plate or plates and the driven disc. When this contact is reached the drag between the pressure plate and flywheel and the driven disc opposes further engagement of the clutch and tends to reduce the speed of the driving member. Meanwhile torque is transmitted which tends to bring the driven member up to the speed of the driving member. If the load to be transmitted is light, relatively little centrifugal force need be developed to establish engagement because the tendency of the clutch to release itself is correspondingly slight. Where a high torque is required to start the driven member, greater speed must be developed in the driving member during the period of initial slip.

It will thus be seen that the engaging pressure developed in the clutch, at least in its initial engagement is measured by the load to be transmitted. By this relationship, one operating the clutch is assured against grabbing because the very tendency to grab asserts itself by opposing and reducing the effective engaging pressure, and is further assured against grabbing by the tendency of the clutch to engage rapidly only when the load is proportionately light, and by the tendency of the clutch to resist engagement when the load is high until such time as the speed of the driving member has gradually become sufficient while overcoming the resistance of the clutch to engage, to carry smoothly the greater load which it undertakes to transmit.

After initial engagement has been effected and during low rotational speeds the governor weights are preferably proportioned to respond to torque overloads by being moved inwardly about their pivots 31 by the relative negative rotation between the pressure plate and the housing 2, thus permitting slippage and dissipation of the overload. When the overload has passed, the weights will again swing outwardly to a position determined by the speed of rotation. During high rotational speeds the governor weights are preferably proportioned to be held in their outermost position by the higher centrifugal force and torque overloads may compress or collapse the springs 33 without effecting any movement of the governor weights; thus also permitting slippage and dissipation of the overload. Theoretically a condition may also exist where the overload force tending to collapse the springs and move the weights inwardly does both things more or less at about the same time with substantially the same result, namely slippage, mentioned above.

Since the clutch disc friction face 15 bears against the flywheel 1 in this form of my invention, the drive is equally divided between the pressure plate 4 and the flywheel 1. The force of drive in the pressure plate is transmitted through the pins 44 and the springs 33. The springs 33 as a group are proportioned to carry substantially one-half of the ultimate desired tangential force of the drive where, as in Fig. 2 only one movable pressure plate is used.

Figure 4:
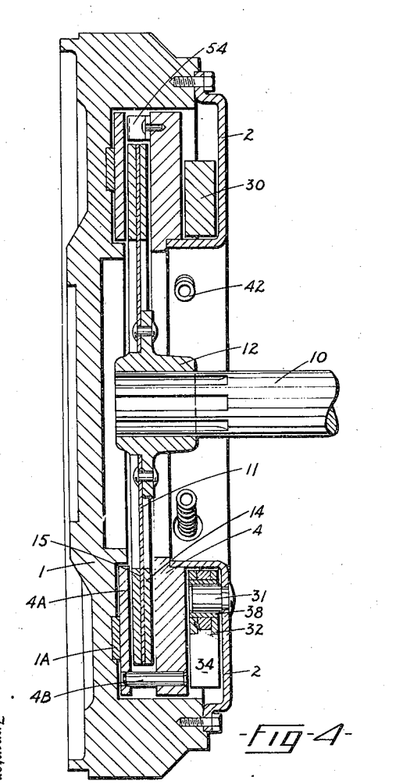
Fig. 4 is an axial section illustrating another form of clutch constructed according to my invention.

Although I have found the mechanism disclosed in Figs. 1, 2 and 3 to be very satisfactory in operation both with respect to the smoothness of its engagement and with respect to its sensitivity to release under overloads or shocks throughout a wide range of speed and load conditions, I contemplate that greater advantages may be obtained at least under some conditions by the application of the principles of my invention to the modification shown in Fig. 4. In the structure shown in Figs. 1 and 2 it will be understood that the driving load is normally taken through both faces of the driven clutch plate, substantially half the load being transmitted through the face 14 and the other half through the face 15; the face 15, bearing directly against the flywheel, normally continuing in static frictional engagement therewith until this engagement is broken by an overload which is made up at least in part of the transfer of load from the rear face 14 to the front face 15 when the release is initiated by circumferential and axial motion of the pressure plate 4 with respect to the flywheel. I contemplate that the mechanism shown in Fig. 4 will be more sensitive in respect to overload slippage and more smooth in its engagement and more adaptable for use with a wider range of friction materials, because I have incorporated in that structure an auxiliary pressure plate or ring 4A, which functions with respect to the forward face 15 of the friction plate in the same way that the pressure plate 4 functions with respect to the rearward face 14 of the friction plate; the plate or ring 4A having a frictionless or relatively low frictional engagement with the flywheel as such. By securing the plates 4 and 4A together with respect to circumferential movement, all of the transmitted torque or load is ultimately transmitted through the pressure plate 4, thence through the springs 33 and the centrifugal governor mechanism. Thus because the auxiliary pressure plate 4A has only a small or negligible friction relationship with the flywheel, the whole of the effect to be established by the engaging and releasing mechanism is applied equally and in the same way on both the front and back sides of the driven friction disc.

The clutch assembly of Fig. 4 may be referred to as a double plate assembly in that the second pressure plate 4A is provided to engage the forward face 15 of the clutch disc. The pressure plate 4A comprises an annular ring mounted for rotary movement within an annular recess in the rear radial wall of the flywheel. A bearing ring 1A is carried by the flywheel within said recess and may be formed of graphite bronze or like material having a low co-efficient of friction to insure relatively free rotary movement of the pressure plate 4A with respect to the flywheel. A plurality of pins 4B carried by the pressure plate 4 extend forwardly therefrom and have a free sliding fit within a like plurality of holes in the pressure plate 4A. A series of leaf springs 54 may be applied to the forward face of the pressure plate 4 beyond the perimeter of the clutch disc in a position to engage the pressure plate 4A to prevent a "freezing" of the pressure plates to the clutch disc as heretofore described.

The double plate construction results in a simultaneous rotary movement of both pressure plates within the clutch mechanism and a maintenance of the same friction bond at both friction faces 14 and 15 of the clutch disc during such movement. The frictional drive through the clutch disc is thus equally distributed as to time and amount and the wear on the friction faces is more evenly proportioned.

Figures 8, 9A, 9B:
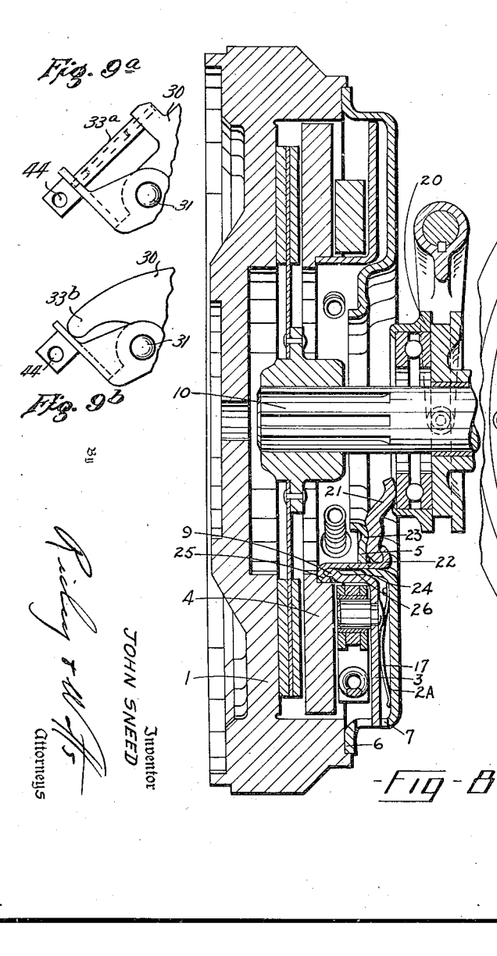

It may be found advantageous in connection with a clutch constructed according to the precepts of my invention to provide a manual release of the clutch and Figs. 8 and 9 illustrate a modified clutch assembly suited for manual release. The clutch casing 2A in this instance is radially flanged at 6 on its outer periphery for attachment to the flywheel and formed at 5 adjacent the central opening to support the manually operated throw-out mechanism. The radially outer wall of the casing 2A is slotted as at 7 to afford a splined engagement with an inner casing 3 mounted for axial movement within the main casing 2A. The casing 3 supports therein the governor weights and pressure plate actuating mechanism as heretofore described in connection with the description of the embodiment shown in Figs. 1, 2 and 3.

The inner flange 5 of the casing 2A is slotted at equally spaced intervals as at 24 adjacent the axial wall of the casing to provide a free sliding fit for clutch throw-out hook members 26. Each hook member 26 is provided at its forward end with an outwardly disposed hook 25 adapted to engage a flanged rim 9 of the inner casing 3. The flange 5 of the main clutch casing 2A is formed with a raised rib 23 adjacent each of the slots 24 that constitute fulcrums for clutch throw-out levers 21. The inner ends of said levers 21 are arranged to engage a throw-out bearing 20 carried by the driven shaft 10 and the outer ends of the levers 21 engage inwardly turned hooks 22 of the hook members 26. A forward movement of the clutch throw-out bearing 20 will cause the levers 21 to turn about fulcrums 23 and pull the hook members 26 and inner casing 3 rearwardly within the outer or main casing 2A. The movement of the throw-out bearing may be effected by a yoke and foot pedal arrangement as will be understood by those skilled in the art. To hold the inner casing 3 forward in its normal operative position a series of perimetrically spaced leaf springs 17 are preferably interposed between the two casings. The operation of the clutch provided with a manual release is substantially as heretofore described in connection with the description of the embodiment of Figure 1 or the double pressure plate arrangement of Figure 4 and it is to be understood that the manual clutch throw-out mechanism may be applied to either of said forms.

Figure 10:
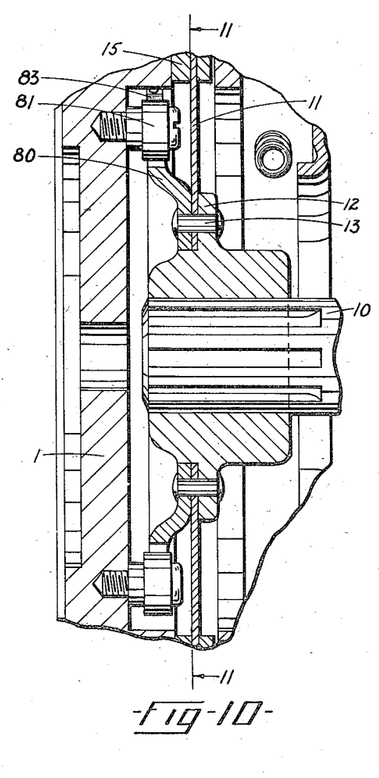
Figs. 10 and 11 are partial sectional and end elevations of the clutch of my invention provided with a means to effect rotation of the prime mover through rotation of the driven part of the clutch.
Figure 11:
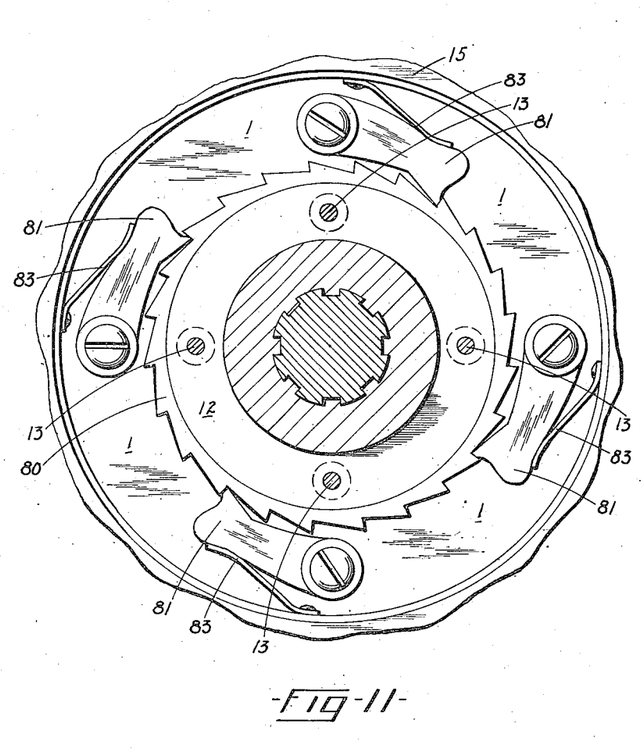

In the event that the clutch of my invention is applied to an automotive vehicle and it is desired to start the engine of the vehicle through the medium of the driven shaft, I have shown in Figs. 10 and 11 a mechanism to accomplish this function. A ratchet ring 80 is applied to the hub 12 of the clutch disc and may be secured thereto by the rivets 13 employed to attach the clutch disc to the hub. Adjacent the periphery of said ratchet ring and pivotally mounted on the flywheel are a group of spring pressed pawls 81. The springs 83 carried by the flywheel urge the pawls into engagement with the ratchet ring 80.

When it is desired to start the prime mover of the motor vehicle by this means, a rotation of the shaft 10 may be effected through a geared engagement of same to the rear wheels of the vehicle and through the pawl and ratchet 80—81 rotate the flywheel. The springs 83 and pawls 81 are so balanced with respect to each other that the centrifugal force attending flywheel rotation will throw the pawls out of engagement with the ratchet ring 80 and compress the springs 83. The pawls will be maintained out of engagement with the ratchet ring by centrifugal force while the motor is running but will be returned to their operative position as soon as the motor stops. The motor driving counterclockwise as seen in Fig. 11 drives the pawls to overrun the ratchet in any event.

To enable those skilled in the art to put my invention into practice more readily, I will set forth in the following paragraph, reference being made to the embodiment of Figures 1, 2, and 3 particularly, an example of the mathematical values which I have found successfully operative for such selectively variable factors as the inclination of the cam faces 51—52 and the weight of the governors 30 and the like.

In a current model of motor vehicle weighing approximately 2600 pounds, with a motor developing about 151 foot pounds torque at 2300 R. P. M. and about 90 brake horse power at 3750 R. P. M., I have satisfactorily operated a clutch constructed according to the precepts of my invention described herein. In this clutch each governor weight 30 weighed about one pound and was pivoted to effect about a 2 to 1 reduction from the center of mass of the governor weight to the point of application to the pins 44 in the pressure plate. The pins 44 were disposed about four inches from the axis of the clutch, which also is roughly the radius of the center of mass of the governor weights, and in this particular instance I used springs 33 which required about 225 pounds pressure to bottom the strands upon each other, and which exerted about 180 pounds when compressed to within about $\tfrac{3}{32}$ of an inch from bottom. With these springs initially compressed at about 180 pounds, an overload or shock of less than 40 foot pounds was required to slip the clutch at and above rotational speeds where the governor weights resisted an inward movement before slippage was effected by compression of the springs. The cam faces 51 and 52 were inclined at about 20 degrees with respect to the radial plane of the pressure plate. The pressure plate and clutch disc had a coefficient of dynamic friction of about .3 and a coefficient of static friction of about .35.

To further illustrate the principles involved in the operation of my clutch and using by way of example the particular values given above, let us assume that the automobile is being operated under a condition where the engine speed is about 2300 R. P. M., and is developing about its maximum torque of 151 foot pounds at that speed. We will also assume for the purpose of this example that the driving and driven members are initially rotating in synchronism, i. e. that the clutch is fully engaged. At this speed each governor weight 30 is swung outwardly by centrifugal force which roughly equals $.0003410\ W.R.N^2$, i. e. about 600 pounds, W being the mass of each weight in pounds, R the radius of rotation in feet, and N the number of revolutions per minute.

In the clutch shown in Figs. 1, 2, and 3, having a single pressure plate to which this example relates, about half the torque will be delivered through the fly wheel to the driven disk, and the other half will be delivered through the pressure plate to the driven disk. Thus in transmitting 151 foot pounds torque about 75½ foot pounds will be transmitted through the pressure plate by way of the springs 33, cams and governors to the driven disc. Since the pins 44 are about four inches or a third of a foot from the axis of the clutch, and since there are three pins 44 through which this torque is transmitted, each pin will have a torque load of about 75½ pounds.

To carry the gross torque load of 151 foot pounds, it is obviously necessary that the pressure plate exert an axial pressure toward the fly wheel sufficient to maintain clutch engagement depending upon the coefficient of static friction of the friction material. In this example the coefficient of friction being .35 and there being two friction surfaces, and assuming the mean effective radius of the friction surfaces to be about four inches from the axis of the clutch, it will be seen that the gross pressure exerted by the pressure plate must equal the torque in foot pounds multiplied by 3 (to give the pounds drag on a four inch radius, i. e. 453 pounds) and that amount must be divided by two times the coefficient of friction, which will equal about 647 pounds.

In the clutch, according to this example, this 647 pounds is developed across the three inclined cam surfaces 51, 52 and since these surfaces are inclined at about 20°, the circumferential pressure which must be applied to the pressure plate on the pins 44 whereby to obtain an axial reaction to develop the above mentioned pressure at each of the pins 44, must equal the gross pressure, 647 pounds, divided by 3 (the number of pairs of cams) and multiplied by the tangent of 20°, which results in about 78.3 pounds pressure, which must also be delivered to each of the pins 44 by the governor weights to maintain the engagement under the condition herein discussed.

As we have seen, the governor must transmit about 75.5 pounds to the pins 44 in opposition to the transmitted torque, and must also deliver to the pins 44 about 78.3 pounds to maintain the pressure on the pressure plate. Thus under the conditions stated the governor must deliver to each of the pins 44 a gross pressure of about 153.8 pounds to maintain the clutch engagement and transmit 151 foot pounds torque. As above indicated, I preferred in this particular clutch to use springs initially compressed to about 180 pounds, so that under the conditions stated the springs would not have been compressed beyond their initial compression to transmit the maximum torque of this particular engine. It will be seen from the above figures, however, that a determinable torque overload or shock will cause the clutch to slip to dissipate the shock and protect the attendant mechanism.

If an overload of 40 foot pounds of torque were thrust upon the clutch, raising the total torque momentarily sought to be transmitted from 151 foot pounds to 191 foot pounds, then each of the pins 44 would tend to have thrust upon it about 95½ pounds direct torque load. The drag in pounds on the four inch mean effective radius of the clutch would be increased to about 573 pounds, which would require a pressure on the pressure plate of about 820 pounds or an axial pressure developed across each pair of cams 51, 52 of about 273 pounds, which would require an additional circumferential pressure from the governors through the springs 33 and pins 44 onto the pressure plate of about 99.5 pounds, which added to the 95.5 pounds torque pressure would demand a total of 195 pounds, i. e. a pressure 15 pounds in excess of that which would cause compression of the springs 33, and would therefore tend to permit the clutch to slip until the overload had been dissipated, or until the condition of overload had ceased to exist.

In a single plate clutch as shown in Figs. 1, 2 and 3, the substance of the foregoing calculations can be expressed in the following formula:—

$$F = \frac{A}{C} + \frac{T}{2}$$

where A is the axial pressure which must be delivered by the pressure plate in the direction of the fly wheel friction face to bind the driven member for any given coefficient of friction on any number of friction surfaces; C is the tangent of the angle of the cams 51, 52 with respect to the radial plane of the pressure plate; T is the torque load measured in pounds at the mean effective radius of the clutch face or faces; and where F is the force in pounds transmitted circumferentially from the weights either through springs 33 or other means to the pins 44, assuming that the pins 44 are at the same radius as the mean effective radius of the clutch faces.

In the modification shown in Figure 4 where two pressure plates are employed, i. e. one on each side of the driven disc, and where all or substantially all of the torque from both sides of the driven disc is transmitted through the pins 44 onto the governor, then the above formula will read:—

$$F = \frac{A}{C} + T$$

From the foregoing calculations and formula it will also be seen that whenever the clutch is caused to slip by a shock or overload, and particularly in instances where the coefficient of dynamic friction is less than the coefficient of static friction, that immediately upon slippage a lesser torque load is imposed on pins 44 which permits a greater portion of the governor delivered pressure to be available through the cams 51, 52 for effecting axial pressure upon the pressure plate. In effect, this means that the condition of slippage tends to be self-eliminative as soon as the condition of overload has ceased to exist. It will also be understood that a condition of slippage necessarily implies a speed difference between the driving and driven member, whereby the kinetic energy of the driving member and driving means, as measured by this differential in speed, is available to tend to bring the driving and driven members into a state of synchronous rotation, when the condition of overload has ceased to exist. For these reasons it will also be appreciated that the clutch, while engaging, that is while changing from a condition of slippage to a condition of synchronous rotation between the driving and driven members, will do so very smoothly and without shock or jar because every tendency which might result in a shock or overload would of itself also tend to continue or begin anew a condition of slippage, while transmitting substantially continuous torque for any given condition of speed and load from the driving to the driven member and always tending to bring the driven member up to the speed of the driving member.

In starting the clutch, discussed herein by way of example of the single pressure plate type, one finds from the formula noted above for centrifugal force, (disregarding for the sake of easy calculation the change in the radius of the center of mass of weights) that each of the weights develops about 28 pounds centrifugal force at about 500 R. P. M., and about 40 pounds centrifugal force at about 600 R. P. M. It will thus be seen that by stressing the governor weight retractor springs 42 to about 28 pounds when the weights are in their innermost position, as shown in Fig. 2, there will be no outward movement of the weights due to centrifugal force at any speed less than 500 R. P. M. By selecting or adjusting the springs 42 to various tensions the speed, when the weights may begin their outward movement, can readily be determined.

Assuming, however, that the springs 42 each exert an initial retracting action on the weights of about 28 pounds, it will be seen that when the engine or driving member is rotating at 600 R. P. M., there will be a resultant available operating centrifugal force of 12 pounds acting radially outward in each weight, which when translated into a circumferential force with a mechanical advantage of about 2 to 1 will make available about 24 pounds to be transmitted circumferentially from each of the weights to each of the pins 44, i. e. to the pressure plate. As noted above this force, which we may for convenience designate $f$, as measured from each weight, is available at each of the pins 44 to move the pressure plate both circumferentially and axially as determined by the cams 51, 52. As has also been demonstrated above, part of the force $f$, which I designate $a$, will be devoted to exerting axial pressure upon the pressure plate, and another part, which I designate $t$, will be available to oppose that portion of the torque which is transmitted through each of the pins 44 onto the governor mechanism.

At 600 R. P. M. the force $f$ of 24 pounds will equal $a$ plus $t$, and if it be desired to know what torque can be transmitted through the clutch at this speed, the following calculations can be made.

The formula heretofore given being, $$F = \frac{A}{C} + \frac{T}{2},$$

and the exemplary clutch having three pins, 20° cams, two friction surfaces, and a coefficient of dynamic friction of .3, then the value of $T$ in the above formula will equal 2 (the number of friction surfaces) times 3 (the number of pins or governor weights) times $t$ (the torque in pounds delivered through each of the pins 44 upon each of the governor weights). It will also be seen that A in the above formula will equal 3 (the number of pairs of cams or pins or governor weights) divided by .364 (the tangent of the angle of inclination of the cams) all multiplied by $a$ (the force delivered by each of the governor weights which is consumed in urging the pressure plate into engagement with the driven disc).

Where the coefficient of dynamic friction is .3 and where the clutch has two friction surfaces, T will equal .6A, and since T equals 6t and A equals $$\frac{3a}{C}$$

then 6t will equal $$\frac{.6(3a)}{C}$$

and $t$ will equal $.825a$. Knowing, as above stated, that $a+t=24$ at 600 R. P. M., then it can be determined that $t$ will equal 10.83 pounds and $a$ will equal 13.17 pounds. Thus T will equal 6t or 65.04 pounds at a four inch radius, which equals 21.66 foot pounds torque. Thus we learn that at 600 R. P. M., while the clutch is slipping, it will potentially transmit 21.66 foot pounds torque.

When in the automobile in which my clutch may be installed, the above amount of torque is sufficient to start the car along the surface upon which it has been standing, and if the engine speed were maintained substantially constant, then a smaller amount of torque would be required to move the car at an even pace than would be required to start it; hence the value of $t$ would become less as the car approached a constant speed, and the value of $a$ would become greater with the result that greater engaging pressures would be developed in the clutch to bring the driving and driven members into synchronism. When synchronism was obtained, there would also be a change from the dynamic to the static coefficient of friction, which would modify the formula $t=.825a$ to read $t=.962a$, and thereafter the maximum value of $t$ for that speed and condition would be 11.77 pounds, and the gross torque then potentially transmittable at that speed would be about 23.54 foot pounds. If a torque load of any greater amount were imposed on the clutch at this speed, slippage would result by virtue of the pressure plate moving counterclockwise as viewed in Fig. 2 and moving the weights inwardly against the resistance of centrifugal force. While the clutch is slipping at this speed it will continue to transmit 21.66 foot pounds as above shown.

Slippage due to overloads will be accomplished in the same manner in the clutch having the specific values herein given at all speeds less than about 1100 R. P. M. At higher speeds overload slippage will be accomplished essentially by compression of the springs 33, if that be desired, in the manner above shown.

From the foregoing example of specific values for governor weights and the like, which have been given to more fully illustrate a specific operative structure built in accordance with the precepts of my invention, it will be understood that some or all of the values given may be varied within reasonably wide limits without departing from the teaching of this specification and that the values given above are given for the purpose of illustration and example. It will also be understood that the calculations above given have been illustrative rather than precisely accurate, such well known phenomena as the stress strain characteristics of the springs being disregarded for the sake of brevity.

It will be understood from the foregoing description that the governor weights 30, the springs 33, if any, the inclination of the cams 51—52, the coefficient of friction between the clutch surfaces, the character of the retractor springs 42, and other elements are all factors which affect each other and contribute to the operating characteristics of the clutch.

Thus it will be observed that the springs 33 might be replaced by solid members 33a as in Figure 9a or that the weights 30 might be provided with integrally formed members 33b arranged to directly engage the pressure plate pins 44 as shown in Figure 9b. This would result in a clutch responsive by slippage under overloads at low rotational speeds by moving the governor weights inward but transmitting all torque up to the effective centrifugal force of the weights at all engine speeds. Since centrifugal force increases as the square of the speed, such a clutch would be substantially non-slippable at high engine speeds, if reasonably slippable at low engine speeds. I contemplate however that this characteristic might be advantageous under some circumstances.

While I have illustrated and described a preferred form of my invention, shown certain specific modifications thereof, and given illustrative examples of a practical embodiment thereof, numerous and various modifications and changes will occur to those skilled in the art all within the spirit and precepts of my invention, and I do not care to be limited to the precise form or forms of my invention herein illustrated and described or limited in any manner other than by the claims appended hereto when construed with the range of equivalents to which they are entitled.

I claim:—

1. In a clutch, a driving member, a movable pressure plate associated therewith, a driven member frictionally engageable with said pressure plate, means interposed between said driving member and said pressure plate and reacting therebetween for translating relative circumferential movement between said member and said plate into axial movement toward or away from said driven member, and means positively responsive to speed and negatively responsive to load for moving said plate with respect to said members.

2. In a clutch, a driving member, a movable pressure plate associated therewith, a driven member frictionally engageable with said pressure plate, and means interposed between said driving member and said pressure plate and rotatable therewith and reacting therebetween in positive response to speed and negative response to load to move said plate into engagement with said driven member, said means comprising a centrifugal governor having a limited movement and resilient means for transmitting the governor actuating force between said plate and said member.

3. A clutch including driving and driven members, means carried by the driving member and arranged between said driving and driven members for limited rotation relative to said driving member, said driven member tending to effect said relative rotation in a direction opposite to the directional rotation of the driving member, and centrifugal force responsive means tending to effect said relative rotation in the same direction as the directional rotation of the driving member.

4. A clutch including driving and driven members and having clutch elements arranged for frictionally interconnecting said members, means to vary said frictional engagement, said means comprising a pair of spring connected movable mechanisms, said mechanisms moving jointly in one direction to increase said frictional engaging pressures in response to increases in rotational speed and being independently movable in an opposite direction to decrease said frictional engaging pressures in response to increases in torque.

5. In a clutch, a driving member, a driven member, pressure plates operatively associated with the driving member and frictionally engageable with the driven member, said plates being circumferentially and axially movable with respect to said driving member, means for translating circumferential movement of said plates into axial movement with respect to said driving member for engagement or disengagement with said driven member, means for moving said plates circumferentially in the same direction as the direction of rotation of the driving member against the resistance of the driven member for exerting engaging pressure upon said driven member whereby the torque transmitted from the driving member through said plates to the driven member tends to release the clutch, and means for permitting the release thereof effective to permit slippage between the pressure plates and the driven member in response to relatively light overloads at low speeds and relatively greater overloads at higher speeds.

6. In a clutch, a driving member, a driven member, a pressure plate operatively associated with the driving member and frictionally engageable with the driven member, said plate being circumferentially and axially movable with respect to said driving member, means for translating circumferential movement of said plate into axial movement with respect to said driving member for engagement with said driven member, means for moving said plate circumferentially in the same direction as the direction of rotation of the driving member against the resistance of the driven member for exerting engaging pressure upon said driven member whereby the torque transmitted from the driving member through said plate to the driven member tends to release the clutch, and means for permitting the release thereof effective to permit slippage between the pressure plate and the driven member in response to relatively light overloads at low speeds and relatively greater overloads at higher speeds.

7. In a clutch, a driving member, a driven member, pressure plates operatively associated with the driving member and frictionally engageable with the driven member, said plates being circumferentially and axially movable with respect to said driving member, means for translating circumferential movement of said plates into axial movement with respect to said driving member for engagement with said driven member, and means for moving said plates rotationally in the same direction as the direction of rotation of the driving member against the resistance of the driven member for exerting engaging pressures upon said driven member whereby the torque transmitted from the driving member through said plates to the driven member tends to release the clutch.

8. In a clutch, a driving member, a driven member, a pressure plate operatively associated with said driving member and movable circumferentially and axially with respect thereto into engagement with said driven member, means interposed between the driving member and said plate for translating relative rotative movement into axial movement therebetween, centrifugally actuated means tending to urge said plate in the direction of rotation of the driving member and into engagement with the driven member, resilient means interposed between said centrifugal means and said plate, and means to limit the movement of said centrifugal means whereby the force required to cause the clutch to slip does not increase with the speed of rotation beyond the point where the limit of movement of said centrifugal means is reached.

9. In a clutch, a driving member, a driven member, a pressure plate associated with said driving member and axially movable into frictional engagement with said driven member, resilient means for driving said pressure plate from said driving member, speed responsive means acting through said resilient means for rotating said pressure plate with respect to said driving member, and load responsive means for translating said rotational movement of said pressure plate with respect to said driving member into axial movement of said pressure plate.

10. In a clutch, a driving member, a driven member, means associated with one of said members adapted to engage the other of said members, speed responsive means tending to establish such engagement and load responsive means tending to establish disengagement, said first named means including a pressure plate having an anti-friction support in said clutch for free movement under the influence of said speed and load responsive means.

11. In a clutch, a driving member, a driven member, means operatively associated with one of said members adapted to frictionally engage the other of said members and means positively responsive to speed and negatively responsive to load acting between one of said members and said first named means for effecting frictional engagement of said members, said last named means including anti-friction means to facilitate the transmission of said positive and negative forces to said first named means.

12. In a clutch, a driving member, a movable pressure plate associated therewith, a driven member frictionally engageable with said pressure plate, means interposed between said driving member and said pressure plate and reacting therebetween for translating relative circumferential movement between said member and said plate into axial movement toward or away from said driven member, and means positively responsive to speed and negatively responsive to load for moving said plate with respect to said member, said last named means including anti-friction means to facilitate the transmission of said positive and negative forces to said plate.

13. In a clutch, a driving member, a driven member, means associated with one of said members adapted to engage the other of said members, speed responsive means tending to establish such engagement and load responsive means tending to establish disengagement, said first named means including a pressure plate having an anti-friction support in said clutch for free movement under the influence of said speed and load responsive means, said anti-friction support comprising round anti-friction devices arranged between opposed inclined surfaces.

14. In a clutch, a driving member, a driven member, means associated with one of said members adapted to engage the other of said members, speed responsive means tending to establish such engagement and load responsive means tending to establish diengagement, said first named means including a pressure plate having an anti-friction support in said clutch comprising anti-friction devices arranged between opposed surfaces which are inclined with respect to said plate at a nonself-sustaining angle whereby the pressure plate is freely movable under the influence of said speed and load responsive means.

JOHN SNEED.